United States Patent
Botargues et al.

(10) Patent No.: US 8,446,295 B2
(45) Date of Patent: May 21, 2013

(54) METHOD AND DEVICE FOR PREVENTING AN ANTI-COLLISION SYSTEM ON BOARD AN AIRPLANE FROM EMITTING ALARMS, DURING AN ALTITUDE CAPTURE MANEUVER

(75) Inventors: Paule Botargues, Toulouse (FR); Xavier Dal Santo, Blagnac (FR); Olivier Sapin, Toulouse (FR); Vincent Bompart, Toulouse (FR)

(73) Assignee: Airbus Operations (SAS), Toulouse (FR)

(*) Notice: Subject to any disclaimer, the term of this patent is extended or adjusted under 35 U.S.C. 154(b) by 378 days.

(21) Appl. No.: 13/015,938

(22) Filed: Jan. 28, 2011

(65) Prior Publication Data
US 2011/0187562 A1 Aug. 4, 2011

(30) Foreign Application Priority Data
Feb. 2, 2010 (FR) ...................................... 10 50718

(51) Int. Cl.
| | | |
|---|---|---|
| G08B 23/00 | (2006.01) | |
| G01C 21/00 | (2006.01) | |
| G01C 22/00 | (2006.01) | |
| B60Q 1/26 | (2006.01) | |
| G06G 7/70 | (2006.01) | |
| G01S 3/02 | (2006.01) | |

(52) U.S. Cl.
USPC ........... 340/970; 340/463; 340/471; 340/961; 340/976; 340/977; 701/23; 701/24; 701/121; 342/29; 342/30; 342/36; 342/455

(58) Field of Classification Search
USPC ................. 340/970, 961, 976, 977, 468, 463, 340/471, 469; 701/914, 121, 5, 301, 23, 24, 701/408; 342/29, 30, 36, 455
See application file for complete search history.

(56) References Cited

U.S. PATENT DOCUMENTS

| 6,583,733 | B2* | 6/2003 | Ishihara et al. ............... 340/946 |
| 7,116,266 | B1* | 10/2006 | Vesel et al. ..................... 342/30 |
| 7,516,014 | B2* | 4/2009 | Hammarlund et al. ....... 701/301 |
| 7,826,971 | B2* | 11/2010 | Fontaine et al. .............. 701/301 |

(Continued)

FOREIGN PATENT DOCUMENTS

| EP | 1240636 | 2/2004 |
| EP | 1630766 | 3/2006 |

(Continued)

OTHER PUBLICATIONS

French Republic Institut National De La Propriete Industrielle, Preliminary Search Report, FR 1050718, Oct. 1, 2010 (2 pgs).

*Primary Examiner* — Daniel Wu
*Assistant Examiner* — Mancil Littlejohn
(74) *Attorney, Agent, or Firm* — Wood, Herron & Evans, LLP

(57) ABSTRACT

According to the invention, the device (1) comprises means (4) for adapting the altitude capture maneuver, means (5) for first detecting the emission of a first type alarm, means (6) for determining a first alarm threshold and means (7) for establishing an activation height threshold from said first alarm threshold and airplane vertical speed at the time of the alarm emission, so that, when the height separating said aircraft (AC) from the altitude set level is strictly higher than said height threshold at the time of the alarm emission, said adaptation means (4) are disabled.

6 Claims, 2 Drawing Sheets

Figure 1:
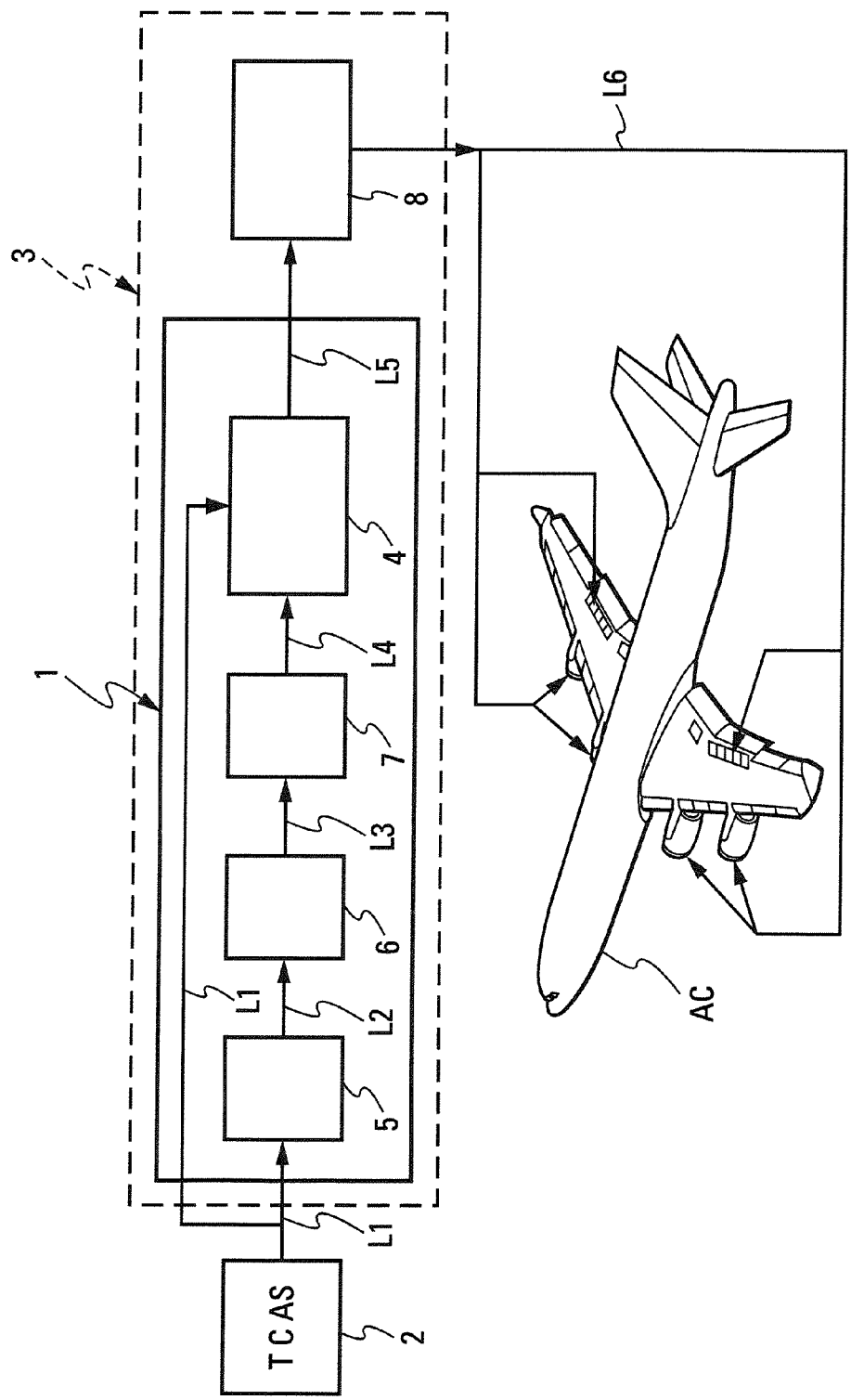

| U.S. PATENT DOCUMENTS | | | | |
|---|---|---|---|---|
| 8,200,421 B2 * | 6/2012 | Botargues et al. | ............ | 701/301 |
| 8,224,505 B2 * | 7/2012 | Botargues et al. | ................ | 701/4 |
| 8,295,996 B2 * | 10/2012 | Botargues et al. | ................ | 701/5 |
| 8,296,054 B2 * | 10/2012 | Botargues et al. | ............ | 701/301 |
| 2008/0021647 A1 * | 1/2008 | Daveze et al. | ................ | 701/301 |

| FOREIGN PATENT DOCUMENTS | | |
|---|---|---|
| EP | 2113897 | 11/2009 |
| FR | 2876483 | 4/2006 |
| FR | 2936343 | 3/2010 |

* cited by examiner

METHOD AND DEVICE FOR PREVENTING AN ANTI-COLLISION SYSTEM ON BOARD AN AIRPLANE FROM EMITTING ALARMS, DURING AN ALTITUDE CAPTURE MANEUVER

The present invention relates to a method and a device for preventing an anti-collision system on board an airplane from emitting alarms, during an altitude capture maneuver, as well as an airplane provided with such a device.

As known, most airplanes are provided with anti-collision systems (generally referred to as TCAS for Traffic Collision Avoidance Systems) allowing to ensure the safety of the air traffic preventing risks of on fight collision.

Thus, when two airplanes are converging one to the other, the anti-collision systems thereof calculate an estimation of the collision time and emit an alarm informing the crews of each airplane of a possible future collision: such an alarm is generally referred to as "traffic notification" or "TA alarm" of the first type. If appropriate, said anti-collision systems further emit, to the attention of the crew, an avoidance maneuver order in the vertical plane so as to get out of the collision possibility situation: such an avoidance maneuver order is generally referred to as <<resolution notification>> or <<RA alarm>> of the second type. The alarms of the first type TA and of the second type RA are materialized by vocal messages and by information being displayed in the cockpits.

In practice, an anti-collision system on board an airplane calculates a collision time in the horizontal plane (ratio between the horizontal distance separating two airplanes and their relative horizontal speed) and a collision time in the vertical plane (ratio between the vertical height of both airplanes and their relative vertical speed). Said thus calculated collision times are compared to alarm thresholds for the TA alarms and for the RA alarms (said alarm thresholds being a function of the altitude of the highest airplane) and the alarms are triggered when the calculated collision times are lower than the corresponding alarm thresholds.

Moreover, as known, it is frequent that an airplane should capture (climbing or descending) a stabilized altitude level (referred to as altitude set level) close to another altitude level allocated to another airplane, and that, according to the air traffic rules, two close stabilized altitude levels are only separated by 300 m (1000 feet).

Thus, because of such a low altitude difference between the stabilized altitude levels, the high vertical speed of modern airplanes and the large size of the air traffic, the anti-collision systems generate numerous TA and RA alarms, while an airplane, vertically moving for changing altitude, correctly maneuvers without any collision risk with another airplane. Such alarms induce much stress for the pilots and are considered operationally useless by the latter, as the altitude capture maneuver is correct and taking into consideration such alarms leads, in most cases, to the air traffic being disturbed Moreover, the RA alarms of the second type during the altitude capture maneuvers are very numerous and are considered to account currently for more than 50% of the total of such alarms in the European space, such a percentage being able to increase in the future as a result of the development of the air traffic.

Thus, for overcoming such drawbacks, means are described in the American patent application U.S. Ser. No. 12/562,808 filed on 18 Sep. 2009 by the Applicant, for limiting the number of alarms emitted by the anti-collision system on board an airplane. More particularly, such means are able to adapt an altitude capture maneuver by a control of the vertical speed of the airplane, so as to maintain the collision time calculated in the vertical plane by the TCAS anti-collision system on board an airplane above the triggering thresholds of the TA and/or RA alarms.

However, the reduction of the vertical speed of the airplane, carried out upon adapting an altitude capture maneuver, leads to extend the performance time of the latter, and, thus, to increase the time spent by an airplane between two altitude levels.

Moreover, in some cases, such a reduction of the vertical speed could also accelerate or cause the emission of a TA and/or RA alarm. Thus, for example, when two airplanes are in a climbing phase, during an altitude capture maneuver, and are in convergence one to the other, a reduction of the vertical speed could bring both airplanes closer one to the other, leading to an alarm being emitted by the on board anti-collision system.

The present invention aims at improving the above mentioned means for adapting the altitude capture maneuver, To this end, according to this invention, the method for preventing at least some alarms to be emitted by an anti-collision system on board an airplane during an altitude capture maneuver comprising a phase for capturing a level of the reference altitude, said anti-collision system on board being able to detect at least one intrusive aircraft being located in the air environment of said airplane, to calculate a theoretical collision time between said airplane and said intrusive aircraft and to emit alarms of the first type and alarms of the second type, when such a theoretical collision time is lower respectively than a first threshold and a second threshold, said method being able to implement a step wherein said altitude capture maneuver is adapted by a control of the vertical speed of said airplane so as to prevent at least some of said alarms to be emitted, is remarkable in that:

A/ during said altitude capture maneuver, the emission of an alarm of the first type is first detected;

B/ said first alarm threshold is determined from the altitude of said airplane at the time of the emission of said alarm of the first type and of said altitude set level; and C/ an activation height threshold is established from said first determined alarm threshold and from the vertical speed of said airplane at the time of the emission of said alarm of the first type, so that:

when the height separating said airplane from said altitude set level, at the time of the emission of said alarm of the first type, is at the most equal to said determined height threshold, said adaptation step is able to be implemented so as to prevent new alarms from being emitted; and when the height separating said airplane from said altitude set level, at the time of the emission of said alarm of the first type, is strictly higher than said height threshold, said step wherein the altitude capture maneuver is adapted is inhibited.

Thus, by means of this invention, the execution of the adaptation of an altitude capture maneuver to meeting situations is restricted between the airplane and an intrusive aircraft, that are considered relevant, so as to avoid unnecessarily penalizing other situations through an anticipated reduction of the vertical speed and, thereby, for example, accelerate or cause RA alarms to be emitted. Indeed, according to this invention, it could be determined whether, from the emission information of a TA alarm, the on-going meeting situation of the airplane and an intrusive airplane is eligible for an adaptation of the altitude capture maneuver. The determined activation height threshold corresponds to the maximum distance, separating the airplane from the altitude set level, from which an adaptation of the maneuver could be carried out, for example, automatically, by a control of the vertical speed of the airplane in the case of a TA alarm being emitted, so as to more specifically preventing RA alarms to be emitted. In the case where a TA alarm occurs at a height separating the airplane from the level of reference strictly higher than the height threshold, the above mentioned adaptation of the maneuver is inhibited, so that no adaptation is carried out, including when the height threshold is reached by the airplane in the absence of the emission of a new TA alarm.

Preferably, said activation height threshold is defined by the equation:

$$ha = S1d.|Vz| + \frac{1}{2}g.|nz|.S1d^2$$

wherein:
- ha is said determined activation height threshold;
- Vz is the vertical speed of said airplane at the time of the emission of said alarm of the first type;
- g.|nz| is the constant vertical acceleration during said capture phase; and
- $S1d$ is said first alarm threshold determined at step B/.

Preferably, in step B/:
- the maximum altitude between the altitude of said airplane is determined at the time of the emission of said alarm of the first type and said altitude set level; and
- with said first alarm threshold, as a function of said determined maximum altitude, a predefined value of alarm threshold is associated, belonging to a predefined set of values of alarm threshold, each one of said values being associated with a given altitude.

Advantageously, said set could comprise predetermined values of reference and approximate values, obtained through a linear approximation of at least some of said values of reference.

The present invention further relates to a device for preventing at least some alarms to be emitted by anti-collision system on board an airplane during an altitude capture maneuver comprising a phase for capturing an altitude set level, said on board anti-collision system being able to detect at least one intrusive aircraft being in the air environment of said airplane, to calculate a theoretical collision time between said airplane and said intrusive aircraft and to emit alarms of the first type and alarms of the second type, when such a theoretical collision time is lower respectively than a first threshold and a second threshold, said device comprising means able to adapt said altitude capture maneuver by a control of the vertical speed of said airplane so as to prevent at least some of said alarms from being emitted. According to this invention, said device further comprises:
- means for first detecting, during said altitude capture maneuver, the emission of an alarm of the first type;
- means for determining said first alarm threshold from the altitude of said airplane at the time of the emission of said alarm of the first type and from said altitude set level; and
- means for establishing an activation height threshold from said first determined alarm threshold and the vertical speed of said airplane at the time of the emission of said alarm of the first type, so that:
  - when the height separating said airplane from said altitude set level, at the time of the emission of said alarm of the first type, is at the most equal to said determined height threshold, said adaptation means are activated so as to be able to adapt said altitude capture maneuver; and
  - when the height separating said airplane from said altitude set level, at the time of the emission of said alarm of the first type, is strictly higher than said height threshold, said adaptation means are disabled.

The present invention further relates to an aircraft comprising a device of the above described type.

The FIGS. of the appended drawing will better explain how this invention could be implemented. On these figures, identical numerals refer to identical parts.

FIG. 1 is a block diagram of a device according to the present invention allowing some alarms to be prevented from being emitted by an anti-collision system on board an airplane, during an altitude capture maneuver.

Figure 2:
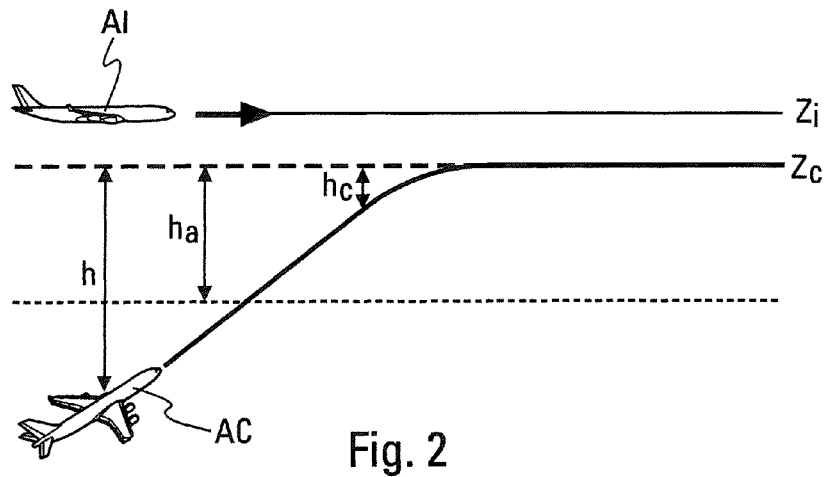
Figure 3:
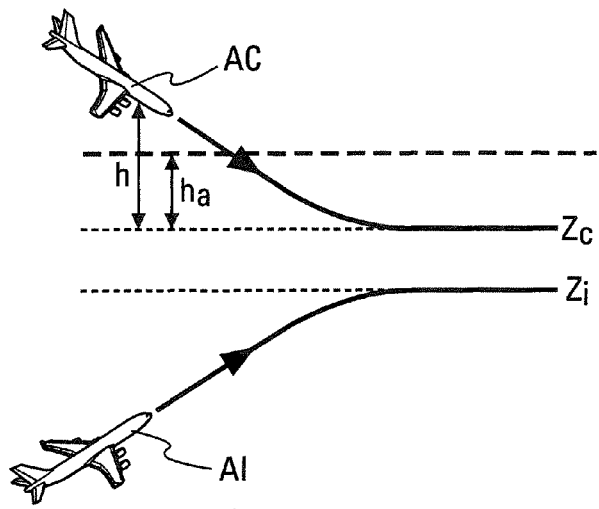

FIGS. 2 and 3 each illustrate an example of a meeting situation eligible for the activation of the adaptation means of the device of FIG. 1, on the provisio that the emission of a TA alarm for a height of the airplane separating it from an altitude set level is at the most equal to a determined height threshold.

Figure 4:
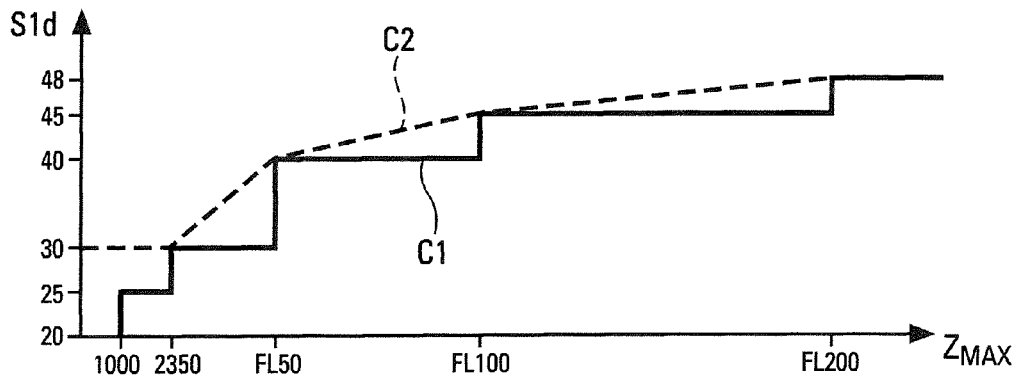

FIG. 4 is a diagram illustrating on the one hand, the evolution of the first alarm threshold as a function of a determined maximum altitude and, on the other hand, a linear approximation of the evolution of said first alarm threshold as a function of said determined maximum altitude.

On FIG. 1, there is shown, in a block diagram view, a device 1, according to this invention, on board an airplane AC. Such a device 1 is to be used for preventing some TA and/or RA alarms from being emitted by a TCAS 2 anti-collision system on board the airplane AC, when the latter is carrying out an altitude capture maneuver for capturing a set level Zc.

The airplane AC is further provided with an automatic piloting system 3 controlling more particularly the vertical speed Vz thereof. The automatic piloting system 3 can comprise at least some of the means 5 to 8 of the device 1 to be later described.

On this FIG., the anti-collision system 2 and the automatic piloting system 3 are shown outside the airplane AC, whereas, they are actually mounted on board the latter.

As known, the anti-collision system 2 is able to detect an intrusive aircraft AI in the air environment of the airplane AC, to calculate a theoretical collision time in the vertical plane between the latter and said intrusive aircraft AI and to emit TA alarms of the first type and RA alarms of the second type for the attention of the crew of the airplane AC in the case where said theoretical collision time is lower respectively than a first alarm threshold and a second alarm threshold.

Additionally, the altitude capture maneuver is defined by the three following successive phases:
- an approach phase (climbing or descent), during which the approach trajectory of the airplane AC is substantially rectilinear and is implemented at a substantially constant vertical speed Vz up to a capture height hc separating the airplane from the set level Zc to be reached;
- an altitude capture phase, starting when the height h of the airplane AC with respect to the altitude set level Zc is at the most equal to the capture height hc (i.e. h≦hc). During the capture phase, the trajectory of the airplane AC is rounded, for example parabolic and is tangent to the set level Zc. The capture height hc is defined by the following equation:

$$hc = \frac{Vz^2}{2g.|nz|}$$

wherein g is the gravity acceleration and nz is the constant vertical loading factor of the airplane AC; and a stabilization phase, during which the trajectory of the airplane AC follows said set level Zc.

According to this invention, as shown on FIG. 1, the device 1 comprises:

means 4 (for example of the type of those described in the American patent application U.S. Ser. No. 12/562,808 filed on 18 Sep. 2009 by the Applicant) able to adapt, for example automatically, an altitude capture maneuver by a control of the vertical speed Vz of the airplane AC and to prevent TA and/or RA collision alarms to be emitted maintaining the collision time calculated in the vertical plane, by the anti-collision system 2, above the corresponding alarm thresholds. Such means 4 are connected to the anti-collision system 2 via a link L1;

means 5 for detecting, during an altitude capture maneuver of the airplane AC, the emission of a TA alarm by the anti-collision system 2. Such means 5 are connected to the anti-collision system 2 via the link L1;

means 6 for determining the value of the first alarm threshold from the altitude Za of the airplane AC during the emission of an alarm TA of the first type and from the altitude set level Zc. Means 6 are able to receive from detection means 5, via a link L2, an emission information of such a TA alarm; and means 7 for establishing an activation height threshold from the first alarm threshold determined by the means 6 et received by a link L3 et from the vertical speed of said airplane at the time of the emission of said alarm of first type, so that:
when the height h separating the airplane AC from the altitude set level Zc, at the time of the emission of a TA alarm, is at the most equal to the determined activation height threshold ha, the adaptation means 4 are activated so as to be able to adapt the altitude capture maneuver; and
when the height h separating the airplane AC from the altitude set level Zc, at the time of the emission of the TA alarm, is strictly higher than the height threshold ha, the adaptation means 4 are disabled. No adaptation will be implemented by the means 4.

The means 7 are able to transmit, via a link L4, an activation or a disabling command of the means 4.

Thus, by means of this invention, the device 1 could determine whether, from the information of the emission of a TA alarm, the on going meeting situation of the airplane AC (carrying out an altitude capture maneuver) of an intrusive aircraft AI is eligible for the activation of the adaptation means 4.

The activation height threshold ha thus corresponds to the maximum distance, separating the airplane AC from the altitude set level Zc, from which the adaptation means 4 are operational and automatically implement an adaptation of the altitude capture maneuver by a control of the vertical speed Vz of the airplane AC, in the case of the emission of a TA alarm.

In the case where a TA alarm occurs at a height h separating the airplane AC from the set level Zc strictly higher than ha (i.e. h>ha), the adaptation means 4 are disabled, so that no adaptation of the maneuver is implemented, including when the height threshold ha is reached by the airplane AC (i.e. for h≦ha) in the absence of an emission of a new TA alarm.

On FIG. 2, a first example of a meeting situation eligible for the activation of means 4, with the proviso that a TA alarm is emitted for a height h of the airplane AC at the most equal to the determined threshold ha. In such an example, the airplane AC carries out an altitude capture maneuver so as to reach a higher set level Zc, when an intrusive aircraft AI, flying at an altitude level Zi above Zc, is identified by the anti-collision system 2.

In the second example of eligible situation of FIG. 3, the airplane AC, carrying out an altitude capture maneuver for reaching a lower level of the reference altitude, is descending, when the anti-collision system 2 detects an intrusive aircraft AI, also carrying out an altitude capture maneuver for reaching an altitude level Zi lower than Zc. The activation of the means 4 will be carried out, with the proviso of the emission of a TA alarm for a height h of the airplane AC at the most equal to the determined threshold ha.

In both above mentioned examples, a TA alarm is strongly able to be emitted by the anti-collision system on board 2 the airplane AC during the altitude capture maneuver.

According to this invention, the activation height threshold ha, determined by the means 7, is defined by the equation:

$$ha = S1d.|Vz| + \frac{1}{2}g.|nz|.S1d^2 \qquad (R1)$$

wherein:
Vz is the vertical speed of the airplane AC at the time of the emission of a TA alarm;
g.|nz| is the constant vertical acceleration during the capture phase of an altitude capture maneuver; and
S1d is the first alarm threshold determined by the means 6.

Indeed, in the vertical plane, the collision timer, determined by the anti-collision system 2, is defined by the following equation:

$$\tau = \left|\frac{Zi - Z}{Vzi - Vz}\right|$$

wherein:
Z and Zi are respectively the altitude of the airplane AC and that of the intrusive aircraft AI; and
Vz and Vzi are respectively the vertical speed of the airplane AC and that of the aircraft AI.

A TA alarm thus occurs when the collision time is equal to the first alarm threshold (function of the altitude of the airplane AC or of the highest intrusive aircraft AI). The following equations are obtained:

$$S1 = \frac{h + hi}{|Vz| + |Vzi|} \qquad (R2)$$

i.e. $h = S1.|Vz| + (S1.|Vzi| - hi)$ wherein:
S1 is the first alarm threshold;
hi is the vertical height between the intrusive aircraft AI and the level of the reference altitude to be reached Zc.

Within the scope of the present invention, the activation height thresholdh ha is an estimation of the maximum height separating the airplane AC from the set level Zc from which a TA alarm could be emitted, in the case where an intrusive aircraft AI carries out an altitude capture maneuver to a flight level at least equal to the altitude set level Zc. The TA alarm occurs further than the set level Zc when the intrusive aircraft AI is the closest to the latter, with a maximum vertical speed. In the case of a capture of the altitude level by the intrusive aircraft AI, its vertical speed is limited to that imposed during the altitude capture phase, having the capture height hc defined by $$hc = \frac{Vz^2}{2g.|nz|}.$$

Replacing hi by hc in the equation R2, a second degree polynomial is obtained as a function of Vzi that can be increased for obtaining the maximum height hmax, then defined as follows:

$$h\max = S1.|Vz| + \frac{1}{2}g.|nz|.S1^2 \qquad (R3)$$

In a particular embodiment of the present invention, it is considered that the automatic piloting system of the airplane AC does not, although it could occur differently, acquire any information from the anti-collision system 2, except that relating to triggering an alarm TA of the first type. Thus, the first alarm threshold, depending by definition on the altitude of the airplane AC or on the highest intrusive aircraft AI, could not be determined in some cases, because the altitude of the intrusive aircraft AI is not supplied to the automatic piloting system 3. As an example, the case where the intrusive aircraft AI is above the airplane AC can be mentioned.

In order to overcome this, as soon as a piece of information of the emission of a TA alarm by the anti-collision system 2 is received, the means 6 are adapted:

to determine the maximum altitude between the altitude Za of the airplane AC, at the time of the emission of the TA alarm and the altitude set level Zc. Indeed, as the altitude of the airplane AC or of the highest intrusive aircraft AI is not known by the automatic piloting system 3, the maximum altitude Zmax between the altitude Za of the airplane AC and the altitude set level Zc are considered. If the intrusive aircraft AI is above the airplane AC, it is located at an altitude at least equal to the altitude set level Zc. On the other hand, if the intrusive aircraft AI is under the airplane AC, the maximum altitude Zmax is that of the airplane AC; and to associate with the first alarm threshold, as a function of the determined maximum altitude Zmax, a predefined value of the alarm threshold belonging to a predefined set of values of the alarm threshold, each of said values being associated with a given altitude. The values of the alarm threshold of said set are for example saved in a memory (not shown on the FIGS.).

Amongst the values of said set, there are the predetermined values of reference, associated with a predefined flight level, and approximated values, obtained through linear approximation of the values of reference.

The table hereunder shows, as an illustrative and not limitative example, predetermined values of reference of said set associated with a given flight level.

| Flight level (in feet) | Value of reference of the first TA alarm threshold (in second) |
|---|---|
| FL200-FL420 | 48 |
| FL100-FL200 | 45 |
| FL50-FL100 | 40 |
| 2350 feet-FL50 | 30 |
| 1000-2350 feet | 25 |
| 0-1000 feet | 20 |

On the diagram of FIG. 4, there is shown, by the curve C1, the evolution of the first determined alarm threshold as a function of the maximum altitude Zmax, from the values of the previous table.

On this same figure, the curve C2 represents a linear approximation of the values of the first TA alarm threshold as a function of the maximum altitude Zmax, allowing a continuity to be obtained of the values of the first TA alarm threshold.

Thus, replacing in the equation R2, the value S1d (corresponding to a value of reference or an estimated value) of the first altitude threshold, determined by the means 6 for the maximum altitude Zmax to be obtained, an activation height threshold ha is achieved, defined by the above mentioned equation R1, i.e.

$$ha = S1d.|Vz| + \frac{1}{2}g.|nz|.S1d^2.$$

When the means 4 are activated and implement an adaptation of an altitude capture maneuver, they emit, via a link L5, commands of vertical speed for the attention of an on board flight calculator 8. Upon receiving such speed commands, the calculator 8 is able to deliver corresponding control commands being, for example, transmitted, by the links L6, to the actuators of the surfaces allowing for the longitudinal control of the airplane AC (elevators, airbrakes) and/or to the engines of said airplane, so as to apply the vertical speed commands determined by the means 4.

The invention claimed is:

1. A method for preventing at least some alarms to be emitted by an anti-collision system on board (2) an airplane (AC) during an altitude capture maneuver comprising a phase for capturing an altitude set level (Zc), said anti-collision system (2) being able to detect at least one intrusive aircraft (AI) being located in the air environment of said airplane (AC), to calculate a theoretical collision time between said airplane (AC) and said intrusive aircraft (AI) and to emit alarms of the first type and alarms of the second type, when such a theoretical collision time is lower respectively than a first threshold and a second threshold, said method being able to implement a step of adaptation of said altitude capture maneuver by a control of the vertical speed of said airplane (AC) so as to prevent at least some of said alarms from being emitted, characterized in that:

A/ during said altitude capture maneuver, the emission of an alarm of the first type is first detected;

B/ said first alarm threshold (S1d) is determined from the altitude of said airplane (AC) at the time of the emission of said alarm of the first type and of said level of the reference altitude (Zc); and C/ an activation height threshold (ha) is established from said first determined alarm threshold (S1d) and from the vertical speed of said airplane at the time of the emission of said alarm of the first type, so that:

when the height (h) separating said airplane (AC) from said altitude set level (Zc), at time of the emission of said alarm of the first type, is at the most equal to said determined height threshold (ha), said adaptation step is able to be implemented so as to prevent new alarms from being emitted; and when the height (h) separating said airplane (AC) from said altitude set level (Zc), at the time of the emission of said alarm of the first type, is strictly higher than said height threshold (ha), said adaptation step of the altitude capture maneuver is inhibited.

2. The method according to claim 1 characterized in that said activation height threshold (ha) is defined by the equation:

$$ha = S1d.|Vz| + \frac{1}{2}g.|nz|.S1d^2$$

wherein:
ha is said determined activation height threshold;
Vz is the vertical speed of said airplane (AC) at the time of the emission of said alarm of the first type;
g.|nz| is the constant vertical acceleration during said capture phase; and
S1d is said alarm threshold determined in step B/.

3. A method according to claim 1, characterized in that, in step B/:
the maximum altitude (Zmax) is determined between the altitude of said airplane (AC) at the time of the emission of said alarm of the first type and said altitude set level (Zc); and
there is associated to said first alarm threshold, as a function of said determined maximum altitude (Zmax), a predefined value of the alarm threshold belonging to a predefined set of values of alarm threshold, each one of said values being associated with a given altitude.

4. A method according to claim 3, characterized in that said set comprises predetermined values of reference and approximate values, obtained through a linear approximation of at least some of said values of reference.

5. A device for preventing at least some alarms from being emitted by an anti-collision system on board (2) an airplane (AC) during an altitude capture maneuver comprising a phase for capturing an altitude set level (Zc), said anti-collision system being able to detect at least one intrusive aircraft (AI) being located in the air environment of said airplane (AC), to calculate a theoretical collision time between said airplane (AC) and said intrusive aircraft (AI) and to emit alarms of the first type and alarms of the second type, when such a theoretical collision time is lower respectively than a first threshold and a second threshold,
said device (1) comprising means (4) able to adapt said altitude capture maneuver by a control of the vertical speed of said airplane (AC) so as to prevent at least some of said alarms from being emitted,
characterized in that said device (1) further comprises:
means (5) for first detecting, during said altitude capture maneuver, the emission of an alarm of the first type;
means (6) for determining said first alarm threshold (S1d) from the altitude of said airplane at the time of the emission of said alarm of the first type and of said altitude set level (Zc); and
means (7) for establishing an activation height threshold (ha) from said first determined alarm threshold (S1d) and from the vertical speed of said airplane at the time of the emission of said alarm of the first type, so that:
when the height (h) separating said airplane (AC) from said altitude set level (Zc), at the time of the emission of said alarm of the first type, is at the most equal to said determined height threshold (ha), said adaptation means (4) are activated so as to be able to adapt said altitude capture maneuver; and
when the height (h) separating said airplane (AC) from said altitude set level (Zc), at the time of the emission of said alarm of the first type, is strictly higher than said height threshold (ha), said adaptation means (4) are disabled.

6. An aircraft comprising the device (1) specified in claim 5.

* * * * *